US005634520A

United States Patent [19]

Stevens et al.

[11] Patent Number: 5,634,520

[45] Date of Patent: Jun. 3, 1997

[54] ENHANCED OIL RECOVERY PROCESS INCLUDING THE SIMULTANEOUS INJECTION OF A MISCIBLE GAS AND WATER

[75] Inventors: Chris E. Stevens, Orchard Point, Singapore; Steven D. McPherson, Rangely, Colo.; John R. Larson, Orchard Point, Singapore; Donnell R. Robie, Rangely, Colo.; Ronald K. Wackowski, Vernal, Utah

[73] Assignee: Chevron U.S.A. Inc., San Francisco, Calif.

[21] Appl. No.: 646,888

[22] Filed: May 8, 1996

Related U.S. Application Data

[63] Continuation of Ser. No. 269,581, Jul. 1, 1994, Pat. No. 5,515,919.

[51] Int. Cl.[6] .......... E21B 43/22

[52] U.S. Cl. .......... 166/402; 166/268

[58] Field of Search .......... 166/268, 273, 166/274, 305.1

[56] References Cited

U.S. PATENT DOCUMENTS

| | | | |
|---|---|---|---|
| 1,511,067 | 10/1924 | Russell . | |
| 3,084,743 | 4/1963 | West et al. . | |
| 3,342,256 | 9/1967 | Bernard et al. . | |
| 3,529,668 | 9/1970 | Bernard | 166/273 |
| 3,599,716 | 8/1971 | Thompson | 166/273 |
| 3,800,874 | 4/1974 | Kern | 166/274 |
| 3,908,762 | 9/1975 | Redford | 166/263 |
| 4,424,863 | 1/1984 | White | 166/268 |
| 4,635,724 | 1/1987 | Bruckdorfer et al. | 166/268 |
| 4,694,904 | 9/1987 | Sengul et al. | 166/252 |
| 4,763,730 | 8/1988 | Suzuki | 166/273 |
| 4,846,276 | 7/1989 | Haines | 166/273 |
| 4,848,466 | 7/1989 | Lin | 166/273 |
| 4,856,589 | 8/1989 | Kuhlman et al. | 166/273 |
| 5,060,727 | 10/1991 | Schramm et al. | 166/252 |
| 5,076,357 | 12/1991 | Marquis | 166/273 |
| 5,193,617 | 3/1993 | D'Souza | 166/263 |
| 5,285,848 | 2/1994 | Chang | 166/274 X |
| 5,515,919 | 5/1996 | Stevens et al. | 166/273 |

OTHER PUBLICATIONS

Society of Petroleum Engineers Journal, The Effects of Water Injection on Miscible Flooding Methods Using Hydrocarbons and Carbon Dioxide by J. L. Shelton and F. N. Schneider, vol. 15, No. 3, Jun. 1975.

Cooperative Agreement DE-FC22-83FE60149, Project OE4, Gas Displacement—Supporting Research, T.H. Chung, J.W. Chism, National Institute for Petroleum and Energy Research, Bartlesville, Okla. Jul. 1–Sep. 1986.

*Primary Examiner*—George A. Suchfield
*Attorney, Agent, or Firm*—Burns, Doane, Swecker & Mathis, L.L.P.

[57] ABSTRACT

An enhanced oil recovery process comprises of the at least periodic introduction of (i) a non-condensible gas preferably selected from among carbon dioxide, nitrogen, methane or mixtures thereof, and (ii) an aqueous drive solution, preferably brine, into a reservoir formation. In this process, the half cycle of non-condensible gas injection, prior to aqueous drive fluid injection, measured in hydrocarbon pore volume is less than 0.25%. In this preferred embodiment, the non-condensible gas, e.g., carbon dioxide, and water, are simultaneously injected into the formation.

11 Claims, 1 Drawing Sheet

3
4
6
5
CP1
SP1
2
$H_2O$
1
$CO_2$

ENHANCED OIL RECOVERY PROCESS INCLUDING THE SIMULTANEOUS INJECTION OF A MISCIBLE GAS AND WATER

This application is a divisional, of application Ser. No. 08/269,581, filed Jul. 1, 1994, now U.S. Pat. No. 5,515,919.

BACKGROUND OF THE INVENTION

This invention relates to an enhanced off recovery process and in particular, a process for enhancing the recovery of oil through fie simultaneous introduction of a non-condensible miscible gas, e.g., carbon dioxide, and an aqueous drive fluid, e.g., brine.

Many petroleum producing formations require assistance to economically produce hydrocarbons therefrom. In particular, the use of primary production techniques, i.e., the use of only the initial formation energy to recover the crude oil, typically recovers less that 50 % Of the original oil present in the formation. Even after the secondary technique of waterflooding, a significant portion of the oil remains behind.

To solve this problem, the art has looked to the use of certain enhanced oil recovery (EOR) techniques. These techniques can be generally classified as thermally based recovery methods, i.e., utilizing steam, or gas-drive based methods that can be operated under either miscible or immiscible conditions. That is, in the gas-drive based methods, for certain crude oils and formation temperatures, the gases, which are typically non-condensible, become miscible with the oil above a pressure known as the minimum miscibility pressure. Above this pressure, these non-condensible gases attain a supercritical state having characteristics of both gases and liquids.

However, because the viscosity of these non-condensible fluids, such as carbon dioxide, is significantly less than that of the crude oil present within the reservoir (carbon dioxide has only 5 to 10% of the viscosity of, e.g., light oil), significant channelling of the gas typically occurs and as a result much, if not most, of the oil in the reservoir is nonetheless bypassed by the gas. In particular, because of the differences in viscosity, "breakthrough" of the carbon dioxide occurs and the subsequently injected gas preferentially follow the path of the breakthrough, thereby resulting in poor sweep efficiencies in the reservoir.

One technique for decreasing this mobility of miscible $CO_2$ in the reservoir involves the use of a drive fluid, i.e., a higher viscosity fluid used to "push" the slug of carbon dioxide. One example of such a process is the Water Alternating-Gas (WAG) process. Such a process comprises the alternating introduction of a non-condensible, miscible gas such as carbon dioxide, nitrogen, methane, mixtures of methane with ethane, propane, butane and higher homologues, with an aqueous drive fluid, e.g., brine. In this process, the water serves to prevent the mobile non-condensible gas from channelling directly from an injection well to a producing well. This ability to slow down gas movement through the reservoir is capable of providing improved contact between the gas and the oil remaining in the reservoir.

However, this process is not without its own set of problems. For example, the gas and the aqueous drive fluid may not be distributed uniformly within the reservoir. In particular, due to differences in viscosity between the water and the carbon dioxide, "gravity override", i.e., gravity segregation of the components, can occur, thereby decreasing the effectiveness of the recovery process. In addition, the WAG process faces certain economic limitations, both with respect to the cost of the non-condensible gas and the labor intensive nature of certain aspects of the process, e.g., alternating between the two components.

Thus, the need still exists for an improved process for the enhanced recovery of petroleum employing a non-condensible, miscible gas.

SUMMARY OF THE INVENTION

Among other aspects, of the present invention is based on the surprising discovery that improvements in both recovery and economics can be provided when the half cycle of non-condensible gas injection to aqueous drive fluid, as measured in hydrocarbon pore volume, in a WAG is reduced to a value less than 0.25% In fact, a still more preferred embodiment of the invention involves the simultaneous injection of the two components.

In one aspect, the process of the present invention comprises at least periodically injecting each of (i) a non-condensible gas and (ii) an aqueous drive fluid, either simultaneously or sequentially, into an oil-bearing formation with the proviso that, if injected sequentially, a half cycle of non-condensible gas injection, measured in hydrocarbon pore volume, is less than 0.25%.

In one particularly preferred embodiment of this process, carbon dioxide is employed as the non-condensible gas, the drive fluid is a brine, and the miscible gas and water are simultaneously injected into the formation.

DETAILED DESCRIPTION OF THE PREFERRED EMBODIMENTS OF THE INVENTION

Figure 1:
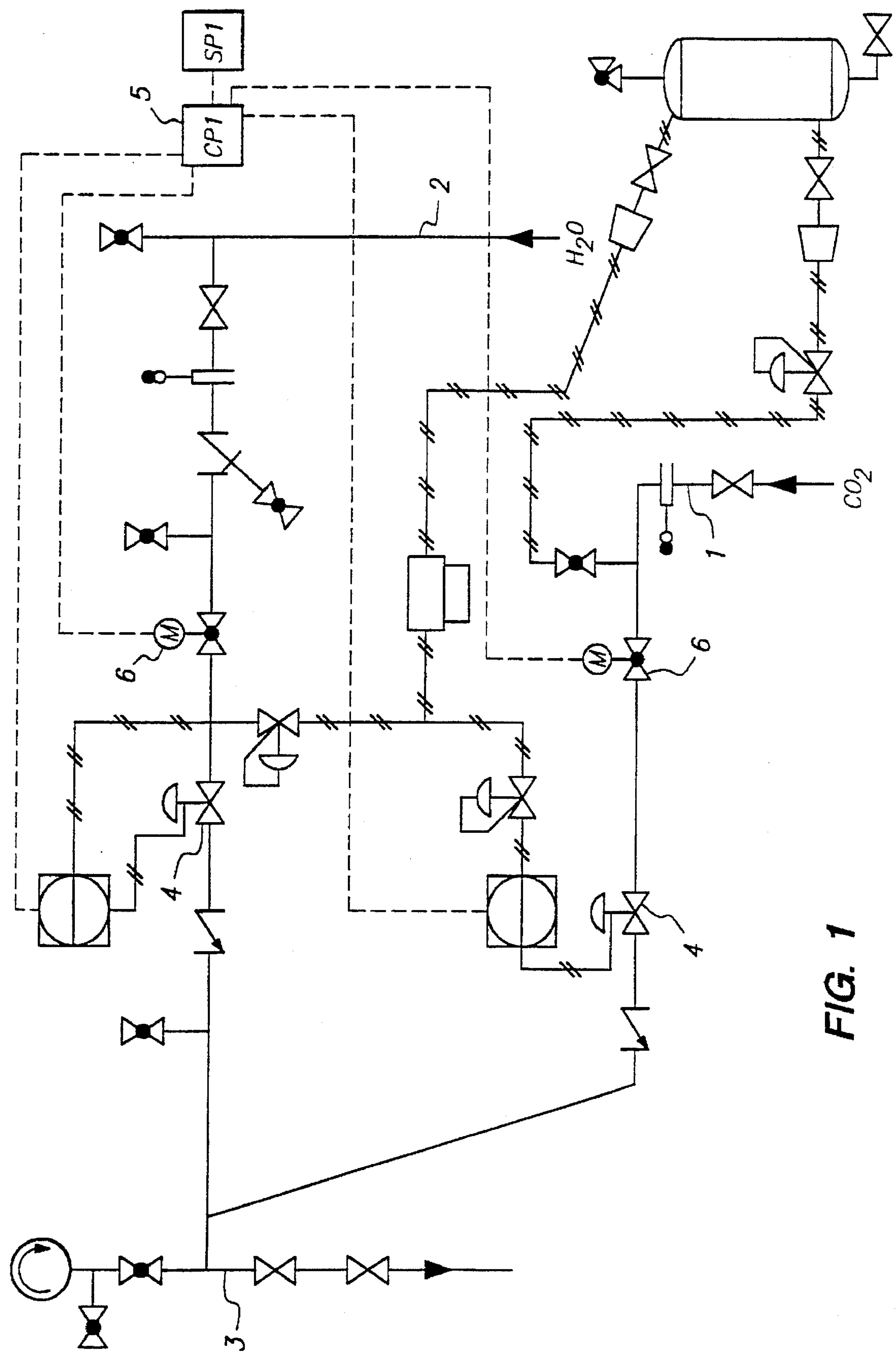
FIG. 1 is a schematic flow diagram of a simultaneous injection system for introduction of both a non-condensible gas and water and which can be employed in one preferred embodiment of the process of the present invention.

As discussed above, the process of the present invention involves the use of a "non-condensible" gases such as carbon dioxide, nitrogen, methane, and the like. In general, such gases have a relatively low critical point, that the temperature above which the gas cannot be compressed into liquid. Moreover, such gases are at least partially soluble in the oil. Thus, because these gases, although not condensible, are in fact miscible in the oil, they are absorbed by the petroleum, so as to reduce the viscosity of the oil and/or to increase its mobility through the formation. At the same time the increased pressure of the gas facilitates movement of residual petroleum in the formation to the reservoir well or wells. Thus, in the context of the present invention they are termed "non-condensible, miscible" gases.

Although the following discussion will focus on one embodiment of the invention relating to the use of miscible carbon dioxide, the process of the present invention is equally applicable to other non-condensible, miscible gases.

The other main component of the process of the present invention is water, i.e., an aqueous drive fluid. This water can be in any form or recognized in the art, e.g., reservoir brines, and as such is not discussed in detail here.

Moreover, the Water Alternating-Gas (WAG) process is itself recognized and in general involves an alternating sequence of water and gas injection until a desired gas slug size is obtained. When the desired size slug is obtained, a chase water flood injection is typically performed. See, for example, U.S. Pat. No. 3,529,668. These gas slugs are measured in terms of hydrocarbon pore volume (HCPV), e.g., a typical slug is from about 10 to as high as 30 or 40% HCPV. The gas slug size is not considered critical to the present invention and will depend, e.g., on reservoir conditions.

Another recognized parameter of the WAG process is the WAG ratio, i.e., the ratio of a water to gas in the process. In this regard, the relative amounts selected are effective to provide for both miscible conditions for the gas in the oil while also minimizing (and optimally preventing) "channeling" or "breakthrough" of the gas. Once again, in the process of the present invention, the WAG ratio is not critical, however, a WAG ratio can typically range from 1:4 to 5:1, with a preferred ratio in certain environments being from 1:1 to 4:1.

Moreover, it is within the context of the present invention to employ "tapering" of this ratio, which involves increasing the WAG ratio, e.g., from 1:1 to 2:1 to 3:1, at decreased gas slug size in order to decrease the required gas production and therefore improve the overall economics of the process.

Yet another parameter of the WAG process is the half cycle, i.e., the amount, measured in hydrocarbon pore volume, of non-condensible gas injected prior to switching to water. Previous WAG processes have typically employed half cycles on the order of 1.5 to 3.0% HCPV. Recently, half cycles as low as 0.25 have been utilized. In the process of the present invention, the inventors have discovered that the use of half cycle less than 0.25%, provides some distinct and unexpected advantages in terms of mixing and retention of the two components in the formation, and therefore lead to an improved recovery.

One particularly preferred embodiment of the present invention involves the simultaneous injection of the non-condensible gas and water into the reservoir.

Any method which can effectively provide for the simultaneous injection of the gas and the drive fluid can be employed in this embodiment of the invention. For example, one possible technique includes the use of check valves, which can be either manually or automatically controlled by ,e.g., a control loop.

As a specific example of one arrangement for use in the process of the present invention, attention is directed to the drawing figure. As illustrated therein, a source of non-condensible gas, e.g., $CO_2$, 1 , and a source of water, 2, are both connected to an injection means, 3, via control valves 4. These control valves can be operated for an example, by a computer, 5, (which, as illustrated in the drawing, can even be solar powered) and flow meters, 6. Such an arrangement allows for the rates of the two components to be set based upon, for example, the total desired injection rate and the WAG ratio.

Moreover, the simultaneous injection process is preferred because it provides for a unique combination of improved efficiency, i.e., particularly in the areas of mixing and retention of the non-condensible gas and water, as well as economics, e.g., the ability to reduce or even eliminate certain labor intensive procedures associated with the WAG process. In particular, this process can provide increased yields of off from the formation while significantly decreasing $CO_2$ requirements, e.g, on the order of 10% or more.

While the present invention has been discussed in terms of various preferred embodiments, various modifications, substitutions, and changes may be made by those skilled in the art without departing from the spirit thereof. Accordingly, it is believed that scope of the present invention should be determined only in terms of the appended claims and equivalents thereof.

What is claimed is:

1. A process for the enhanced recovery of oil from an oil-bearing reservoir formation comprising injecting effective oil producing amounts of (i) a non-condensible gas and (ii) an aqueous drive fluid simultaneously into the formation characterized in that the gas and aqueous drive fluid begins from an initial preselected water to gas ratio and increases to a ratio of 2:1 to 3:1 and wherein the amount of said gas injected is effective to reduce the viscosity of the oil or to increase its mobility through the reservoir formation.

2. The process according to claim 1 wherein the non-condensible gas is selected from among carbon dioxide, nitrogen, and methane.

3. The process according to claim 1 wherein the non-condensible gas is carbon dioxide.

4. The process according to claim 1 wherein the aqueous drive solution is brine.

5. The process according to claim 1 wherein the non-condensible gas is carbon dioxide, and the drive fluid is brine.

6. The process according to claim 1, wherein the preselected water to gas ratio is about 1:1.

7. In an enhanced oil recovery process including at least periodic injection of (i) a non-condensible gas and (ii) an aqueous drive fluid into a reservoir formation, wherein the improvement comprises injecting (i) and (ii) simultaneously into the reservoir formation from an initial water to gas ratio and increases to a higher ratio of between 2:1 and 3:1 wherein the amount of non-condensible gas injected as measured in hydrocarbon pore volume, is less than 0.25% and wherein the amount of said non-condensible gas injected is effective to reduce the viscosity of the oil or to increase its mobility through the reservoir formation.

8. The process according to claim 7, wherein the non-condensible gas comprises carbon dioxide, nitrogen, methane or mixtures thereof.

9. The process according to claim 7, wherein the non-condensible gas is carbon dioxide.

10. The process according to claim 7, wherein the aqueous drive fluid is brine.

11. The process according to claim 7, having an initial water to gas ratio of about 1:1.

* * * * *